(12) United States Patent
Fuhrmann et al.

(10) Patent No.: US 12,552,694 B2
(45) Date of Patent: Feb. 17, 2026

(54) USE OF TRIVALENT METALS TO ENHANCE AQUATIC PESTICIDE EFFICACY, SURFACE WATER, AND SEDIMENT QUALITY WHILE MINIMIZING RISK TO AQUATIC BIOTA

(71) Applicant: SePRO Corporation, Carmel, IN (US)

(72) Inventors: Byran C. Fuhrmann, Rocky Mount, NC (US); Ben Willis, Rocky Mount, NC (US); West M. Bishop, Kings Mountain, NC (US); Chase Kilgore, Rocky Mount, NC (US)

(73) Assignee: SePRO Corporation, Carmel, IN (US)

( * ) Notice: Subject to any disclaimer, the term of this patent is extended or adjusted under 35 U.S.C. 154(b) by 366 days.

(21) Appl. No.: 18/304,032

(22) Filed: Apr. 20, 2023

(65) Prior Publication Data

US 2023/0339787 A1 Oct. 26, 2023

Related U.S. Application Data

(60) Provisional application No. 63/333,870, filed on Apr. 22, 2022.

(51) Int. Cl.
   *C02F 1/26* (2023.01)
   *C02F 1/50* (2023.01)
   *C02F 1/62* (2023.01)

(52) U.S. Cl.
   CPC .............. *C02F 1/50* (2013.01); *C02F 1/26* (2013.01); *C02F 1/62* (2013.01); *C02F 2303/04* (2013.01); *C02F 2303/18* (2013.01)

(58) Field of Classification Search
   CPC ...... C02F 1/50; C02F 1/26; C02F 1/62; C02F 2303/04; C02F 2303/18; C02F 1/5236;
   (Continued)

(56) References Cited

U.S. PATENT DOCUMENTS 5,976,401 A * 11/1999 Suzuki ............... C02F 1/281
                                                  210/683
2012/0187337 A1* 7/2012 Hassler ............ C02F 1/5236
                                                  210/668
(Continued)

FOREIGN PATENT DOCUMENTS

CN         1673108 A   *  9/2005
CN       102311160 A   *  1/2012
(Continued)

OTHER PUBLICATIONS

English translation of CN1673108A, Sep. 28, 2005. (Year: 2005).*
(Continued)

*Primary Examiner* — Joseph W Drodge
(74) *Attorney, Agent, or Firm* — Koenig IP Works, PLLC; Katherine Koenig

(57) ABSTRACT

Products and methods related to the enhancement of efficacy of algaecides and/or aquatic herbicides using metallic trivalent cations, as well as the reduction in ecotoxicity and non-target effects and preservation of water quality. Some embodiments advantageously provide the benefit of binding phosphorus, but allow for a substantial reduction in the dissolved trivalent metal and an increased ability to target the main source of future phosphorus release. In one aspect of an embodiment, a trivalent cation delivery system includes a commonly available commodity that can be simultaneously added to the water or mixed in a tank prior to the application, avoiding the need for an industrial process to cohere the components. In another aspect of the embodiment, the trivalent cation delivery system may be accomplished by the use of an algaecide and/or aquatic herbicide prior to the application of the phosphorus binding metal.

10 Claims, 2 Drawing Sheets

(58) Field of Classification Search
CPC .... C02F 1/505; C02F 1/722; C02F 2101/105; C02F 2103/007; C02F 2101/20
See application file for complete search history.

(56) References Cited

U.S. PATENT DOCUMENTS

| | | | |
|---|---|---|---|
| 2012/0261611 A1* | 10/2012 | Hassler | C02F 1/5236 210/660 |
| 2015/0157014 A1* | 6/2015 | Hani | C02F 1/50 504/121 |
| 2016/0096747 A1* | 4/2016 | Richardson | B01J 20/3433 210/287 |
| 2019/0127246 A1* | 5/2019 | Haneline | C02F 1/5236 |

FOREIGN PATENT DOCUMENTS

| | | | | |
|---|---|---|---|---|
| CN | 105366781 A | * | 3/2016 | C02F 1/5263 |
| CN | 110605102 A | * | 12/2019 | C02F 1/285 |
| CN | 111889064 A | * | 11/2020 | B01J 20/28083 |

OTHER PUBLICATIONS

English translation of CN102311160A, Jan. 11, 2012. (Year: 2012).*
English translation of CN_105366781A, Mar. 2, 2016. (Year: 2016).*
English translation of CN_110605102A, Dec. 24, 2019. (Year: 2019).*
English translation of CN_111889064A, Nov. 6, 2020. (Year: 2020).*

* cited by examiner

USE OF TRIVALENT METALS TO ENHANCE AQUATIC PESTICIDE EFFICACY, SURFACE WATER, AND SEDIMENT QUALITY WHILE MINIMIZING RISK TO AQUATIC BIOTA

CROSS-REFERENCE TO RELATED APPLICATIONS

This application is related to and claims priority to U.S. Provisional App. No. 63/333,870, filed Apr. 22, 2022, entitled USE OF TRIVALENT METALS TO ENHANCE SURFACE WATER AND SEDIMENT QUALITY WHILE MINIMIZING RISK TO AQUATIC BIOTA, the entirety of which is incorporated herein by reference.

FIELD

This disclosure relates to the use of phosphorus-binding metals in surface waters to target water column phosphorus while substantially reducing the concentration of the dissolved metals in the water column that can be ecotoxic at higher doses. In addition, this disclosure also relates to the use of these phosphorus-binding metals in combination with algaecides and/or aquatic herbicides to enhance algaecide and/or aquatic herbicidal efficacy, preserve dissolved oxygen at the sediment-water interface, and reduce the concentration of copper following the application of copper-based pesticides. Further, these metals can also be used by themselves in eutrophic waters to reduce the accumulation of sediment organic matter and enhance sediment redox.

GOVERNMENT RIGHTS STATEMENT

N/A.

BACKGROUND

Surface waters rich in phosphorus (P) can become eutrophic, a condition characterized by excessive growth of nuisance photosynthetic organisms, such as aquatic invasive plants, algae and/or cyanobacteria. Surface waters can become enriched with P because of external input from sources such as runoff or internal loading from P-rich sediments. Once a surface water body has become enriched with P, increased P levels tend to remain within that water body due to the recycling after the death, decay, and release of nutrients from aquatic organisms within the water column.

External input can be slightly reduced using stormwater best management practices (BMPs), but substantial reductions are extremely rare and only occur within very isolated watersheds. In most lakes and reservoirs, it is much more cost-effective and feasible to manage internal phosphorus resources to prevent eutrophication, a process known as P inactivation.

Trivalent metallic cations ($M^{3+}$) such as lanthanum ($La^{3+}$), cerium ($Ce^{3+}$), aluminum ($Al^{3+}$), and iron ($Fe^{3+}$) have high P binding affinity. These cations are commonly used in the form of sulfate or chloride salts in wastewater treatment to remove excess P before the treated wastewater is discharged, in order to meet total maximum daily loads (TMDLs) and to reduce the potential for eutrophication in surface waters. In wastewater treatment, multi-stage processes such as aerobic digestion, anaerobic digestion, primary and secondary clarification, and disinfection with powerful oxidants leads to the nearly complete removal of the dissolved cations which could be toxic to aquatic biota if discharged. In surface waters, the use of P-binding salts is substantially limited due to the potential for aquatic ecotoxicity. This limitation in the total amount of P binding compounds that can be added at one time can limit the ability of lake and reservoir managers to effectively combat eutrophication and can substantially increase the total cost of P mitigation due to the requirement for multiple treatments.

Aquatic herbicides and/or algaecides are used to effectively manage nuisance photosynthetic organisms in eutrophic surface waters through a variety of mechanisms that ultimately result in the death of the target. In the United States, these products must be registered with the Environmental Protection Agency and undergo thorough risk assessment and evaluation before they can be used in lakes and reservoirs. Maximum labeled use rates are determined based on worse case scenarios and also include safety factors that may be multiple orders of magnitude less than the median lethal dose ($LD_{50}$). This is done to ensure the safety of non-target aquatic biota, but can also limit the effectiveness of the pesticide in waterbodies with a high abundance of nuisance photosynthetic organisms. Therefore, some highly eutrophic lakes and reservoirs may require multiple algaecide and/or aquatic herbicide applications or rely on a combination of these products in order to effectively control the nuisance algae, cyanobacteria, and/or plants.

Algaecides used in lakes and reservoirs are most commonly comprised of copper complexes, which have been shown to be highly toxic to algae and cyanobacteria by initiating cell lysis and inhibiting anti-oxidant systems, although the exact mechanism of action remains unclear. Copper is also used as an aquatic herbicide through similar function in aquatic plants. Copper-based algaecides and herbicides are more damaging to algae, cyanobacteria, and aquatic plants than they are to non-target biota such as fish and zooplankton, and non-target toxicity is exceedingly rare when copper-based aquatic pesticides are used in accordance with the product labels. Due to the fact that nuisance photosynthetic organisms are more sensitive to copper pesticides, they can be rapidly controlled using copper-based pesticides. However, there is currently no simple strategy for removing copper from a water body and typically a filtration system is required.

Both internal and external nutrient loading ultimately lead to the accumulation of organic matter in sediments, causing eutrophication in natural lakes and reservoir aging in artificial reservoirs. Sediment organic matter accumulation and low sediment quality is indicated by high organic matter content, high porosity or low bulk density, and high sediment-oxygen demand. High sediment quality is thus demonstrated by low organic matter content, low porosity or high bulk density, and low sediment-oxygen demand. Low sediment quality can lead to the depletion of dissolved oxygen and reduced redox at the sediment-water interface which can lead to the release of water quality contaminants.

A variety of products containing bacteria and enzymes claim to reduce "muck," a synonym for low-quality sediment. Although the sediment bacterial community directly influences the sediment quality through the degradation of organic matter, it is not well understood how the addition of non-native bacteria or enzymes impacts sediment quality. Oxygenation and aeration have been purported to improve sediment quality, but these systems require continuous operation and maintenance or else the benefits can subside. Overall, there are currently no established chemical additives that can improve sediment quality.

SUMMARY

Some embodiments advantageously provide the benefit of binding phosphorus, but allow for a substantial reduction in the dissolved trivalent metal and an increased ability to target the main source of future phosphorus release. In one aspect of an embodiment, a method of reducing a dissolved metal concentration in a body of water is provided, wherein the product includes at least one trivalent metal salt and at least one additive. In one aspect of the embodiment, the at least one trivalent metal salt being present in an amount capable of enabling the product to bind phosphorus in a body of water; and the at least one additive being present in an amount capable of enabling the product to bind trivalent metals from the at least one trivalent metal salt dissolved in a body of water when the product is applied to the body of water.

In one aspect of the embodiment, the at least one trivalent metal salt includes a trivalent metal salt of at least one of aluminum, cerium, lanthanum, and iron.

In one aspect of the embodiment, the at least one trivalent metal salt comprises a mixture of approximately 33% lanthanum chloride and approximately 67% cerium chloride.

In one aspect of the embodiment, the at least one additive is magnesium oxide and/or bentonite clay.

In one aspect of the embodiment, the at least one additive includes approximately 37.5% magnesium oxide by weight and approximately 62.5% bentonite clay by weight.

In one aspect of the embodiment, the at least one trivalent metal salt is a solution of at least one of aluminum, cerium, lanthanum, and iron; and the at least one additive is at least one of magnesium oxide and bentonite clay, the at least one trivalent metal salt and the at least one additive being applied simultaneously to the body of water.

In one embodiment, a method of treating a body of water includes: applying at least one aquatic pesticide to the body of water to adversely affect at least one target organism; and applying a water treatment product to the body of water before, during, and/or after the application of the aquatic pesticide to the body of water, the water treatment product including at least one trivalent metal salt; and the at least one trivalent metal salt being configured to bind phosphorus within the body of water and/or to reduce a depletion of dissolved oxygen within the body of water.

In one aspect of the embodiment, the at least one aquatic pesticide includes at least one of diquat, carfentrazone, and fluridone.

In one aspect of the embodiment, the at least one aquatic pesticide includes a copper-based algaecide.

In one aspect of the embodiment, the at least one aquatic pesticide includes at least one of chelated copper and a peroxide algaecide.

In one aspect of the embodiment, the water treatment product produces a synergistic effect with the at least one aquatic pesticide to enhance the efficacy of the at least one aquatic pesticide.

In one aspect of the embodiment, the water treatment product is applied simultaneously with the at least one aquatic pesticide.

In one aspect of the embodiment, the water treatment product is applied before the at least one aquatic pesticide is applied.

In one aspect of the embodiment, the water treatment product includes the at least one aquatic pesticide.

In one aspect of the embodiment, the at least one trivalent metal salt includes a trivalent metal salt of at least one of aluminum, cerium, lanthanum, and iron.

In one aspect of the embodiment, the at least one trivalent metal salt comprises a mixture of approximately 33% lanthanum chloride by weight and approximately 67% cerium chloride by weight.

In one embodiment, a water treatment product includes: at least one trivalent metal salt, the at least one trivalent metal salt being configured to bind phosphorus within the body of water; and at least one additive, the at least one additive being configured to bind metal from the at least one trivalent metal salt dissolved in the body of water.

In one aspect of the embodiment, the at least one additive includes at least one of magnesium oxide and bentonite clay.

In one aspect of the embodiment, he at least one additive includes magnesium oxide present in an amount of approximately 37.5% by weight and bentonite clay present in an amount of approximately 62.5% by weight. In one aspect of the embodiment, the at least one trivalent metal salt comprises a mixture of approximately 33% lanthanum chloride and approximately 67% cerium chloride.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
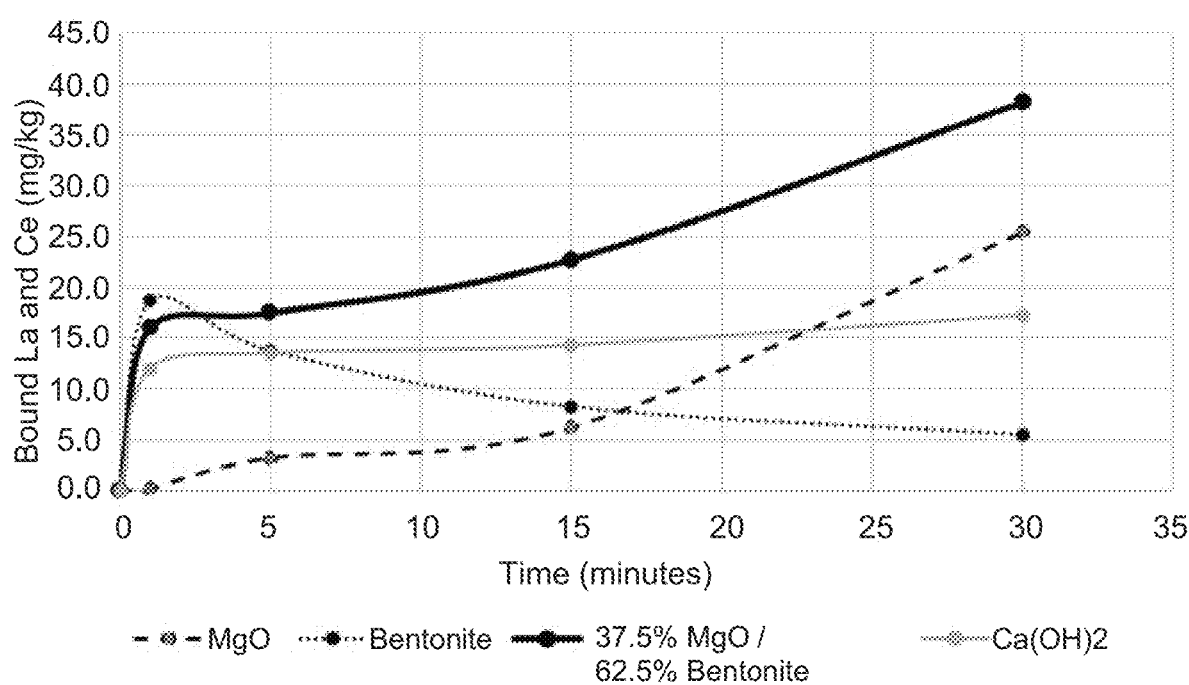
FIG. 1 is a chart showing bound lanthanum and cerium over time for magnesium oxide, bentonite clay, 37.5% magnesium oxide and 62.5% bentonite clay mixture, and calcium hydroxide, in accordance with the present disclosure.
Figure 2:
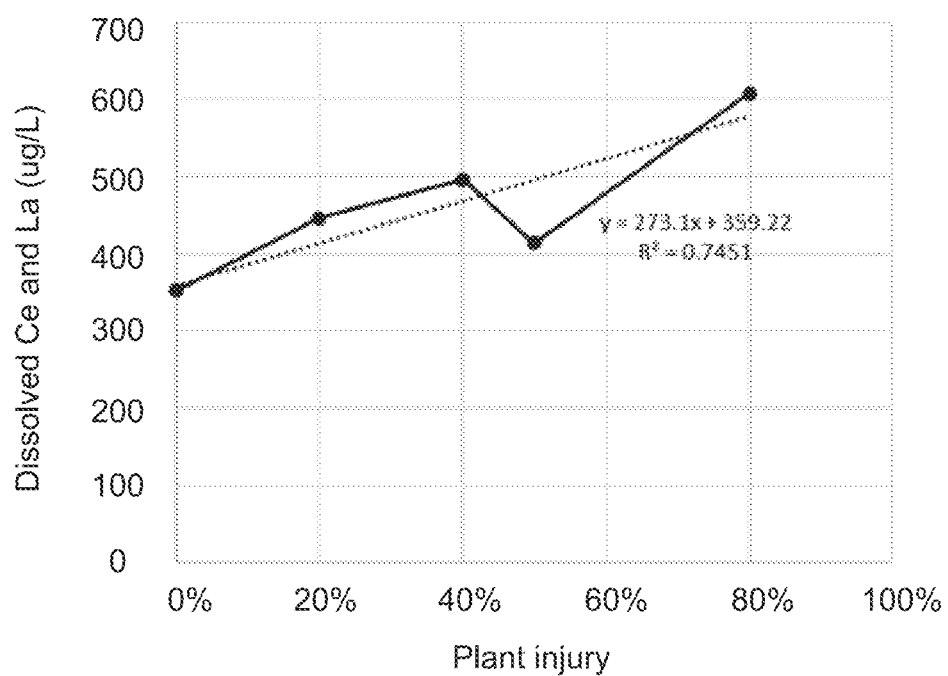
FIG. 2 is a chart showing a relationship between dissolved cerium and lanthanum (µg/L) to percent observed plant injury, in accordance with the present disclosure.

Before describing in detail exemplary embodiments, it is noted that the embodiments reside primarily in combinations of products and methods related to the enhancement of efficacy of algaecides and/or aquatic herbicides using metallic trivalent cations, as well as the reduction in ecotoxicity and non-target effects and preservation of water quality. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

As used herein, the phrase "one or more of," e.g., "one or more of A, B, and/or C," means "one or more of A," "one or more of B," "one or more of C," "one or more of A and one or more of B," "one or more of B and one or more of C," "one or more of A and one or more of C," and "one or more of A, one or more of B, and one or more of C." As used herein, "and/or" means "and" or "or". For example, "A and/or B" means "A, B, or both A and B" and "A, B, C, and/or D" means "A, B, C, D, or a combination thereof" and said "A, B, C, D, or a combination thereof" means any subset of A, B, C, and D, for example, a single member subset (e.g., A or B or C or D), a two-member subset (e.g., A and B; A and C; etc.), or a three-member subset (e.g., A, B, and C; or A, B, and D; etc.), or all four members (e.g., A, B, C, and D).

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure provides products and their uses for reducing dissolved trivalent metals to reduce non-target ecotoxicity and to enhance targeted delivery of trivalent metals for phosphorus control, the enhanced efficacy of herbicidal and algaecidal treatments, the reduction of dissolved copper following the use of copper-based algaecides and/or herbicides, and the preservation of dissolved oxygen, enhancement of redox, and enhancement of sediment quality in a body of water. Each of these aspects is discussed hereinbelow.

Binding Dissolved Trivalent Metals without Reducing their Ability to Bind Phosphorus In some embodiments, products in accordance with the present disclosure include complexes of aluminum, cerium, lanthanum, and/or iron with anions including, but not limited to, chlorides, sulfates, nitrates, oxides, hydroxides, citrates, acetates, oxychlorides, silicates, oxalates, carbonates, and/or bicarbonates. In some embodiments, products in accordance with the present disclosure additionally include, in addition to the metallic trivalent cation complexes, one or more additives including, but not limited to, rice bran powder, magnesium oxide, and bentonite. In one embodiment, a product includes a metal salt capable of binding P, and an additive capable of binding a dissolved form of the metal. In one embodiment, a product includes a salt of lanthanum and/or cerium, as well as an additive. In one embodiment, the additive selected from the group consisting of rice bran powder, magnesium oxide, and bentonite. These materials could be added to surface waters as dry materials or combined into a liquid product containing the trivalent metal salt and the additive capable of reducing the dissolved metal concentration. In one exemplary method of use, a liquid product is added to flowing waters. In one exemplary method of use, a product is applied to a body of water (for example, as dry material and/or as liquid product) simultaneously with an algaecide and/or aquatic herbicide. In one exemplary method of use, the product is applied to a body of water before, during, and/or after the application of an algaecide and/or aquatic herbicide. In one embodiment, the algaecide and/or aquatic herbicide causes the release of P from the target organism, and the metal salt in the product binds to the P while the additive of the product binds to the dissolved metal of the metal salt, thus removing both P and dissolved metal from the body of water.

Example 1

In one exemplary experiment, a stock solution was made by combining approximately 542 mg of lanthanum chloride ($LaCl_3$), approximately 534 mg of cerium chloride ($CeCl_3$), and 40 mL of deionized water. The stock solution included approximately 10 mg lanthanum (La) per L (±1.0 mg/L) and approximately 10 mg cerium (Ce) per L (±1.0 mg/L), and this stock solution was used as a control. To create each test sample, approximately 100 µL of the stock solution was added to approximately 50 mL of deionized water with between approximately 90-110 mg of an additive. A test sample was made for each additive. Additives tested in this exemplary experiment included calcium carbonate, triethanolamine, silica gel, almond shell powder, animal glue, rice bran powder, magnesium oxide, carrageenan, sodium acrylate, beef gelatin, acacia gum, bentonite, sodium citrate, sodium EDTA, sodium alginate, calcium hydroxide, sodium hydroxide, carboxymethylcellulose, chitosan, zeolite (crushed), sodium metasilicate (anhydrous), potassium oxalate (monohydrate), activated carbon, cellulose, baking soda, sodium tartrate, and glutamine. Each sample was shaken then allowed to sit for five minutes, then shaken again before a 5-mL subsample was removed and filtered through 0.22 µm nylon. Each filtered subsample was then acidified with 2% nitric acid and analyzed for presence and amounts of lanthanum (La) and cerium (Ce) using inductively coupled plasma optical emission spectroscopy (ICP-OES). The pH of each analyzed subsample was less than 2 after the 2% nitric acid was added. Additionally, approximately 1 ppm P was added to the remaining 45-mL samples after testing for La/Ce and then each sample was capped, shaken, and filtered. A reagent was then added to each filtered sample that indicated the presence of dissolved P (samples with remaining dissolved P turned blue, whereas samples without remaining dissolved P remained clear).

As is shown below in Table 1, test samples containing the additives rice bran powder, magnesium oxide, or bentonite displayed a significant percent reduction (≥75%±10%) in dissolved lanthanum and cerium, while still binding P. For example, a test sample containing approximately 96.1 mg (±0.5 mg) of rice bran powder produced a reduction in dissolved La of approximately 88% (±10%) and a reduction in dissolved Ce of approximately 84% (±10%); a test sample containing approximately 100.4 mg (±0.5 mg) of magnesium oxide produced a reduction in dissolved La of approximately 99% (±10%) and a reduction in dissolved Ce of approximately 99% (±10%); and a test sample containing approximately 100.6 mg (±0.5 mg) of bentonite produced a reduction in dissolved La of approximately 88% (±10%) and a reduction in dissolved Ce of approximately 92% (±10%). All three test samples displayed P-binding capability.

TABLE 1

Table 1. Capacity of different additives to bind La, Ce, and P.

| Sample/Additive | Weight (mg) | pH | La (mg/L) | Ce (mg/L) | % La reduction | % Ce reduction | La bound (mg/g) | Ce bound (mg/g) | Total La/Ce bound (mg/g) | Also binds P |
|---|---|---|---|---|---|---|---|---|---|---|
| Control (average) | — | 7 | 10.833 | 10.833 | — | — | — | — | — | — |
| Rice bran powder | 96.1 | 7 | 1.35 | 1.77 | 88% | 84% | 4.93 | 4.72 | 9.65 | YES |
| Magnesium oxide | 100.4 | 7.5 | 0.102 | 0.0662 | 99% | 99% | 5.34 | 5.36 | 10.71 | YES |
| Bentonite clay | 100.6 | 7.5 | 1.35 | 0.884 | 88% | 92% | 4.71 | 4.94 | 9.66 | YES |

Thus, the additives shown above in Table 1 are capable of removing dissolved metallic trivalent cations in situ (without a complex series of removal steps, as is currently used), while still preserving the ability of the metals to bind P. When used in a body of water, products containing one or more of the additives in Table 1 with a P-binding metal bind to both dissolved metallic trivalent cations and P, resulting in removal of not only the dissolved metals to reduce ecotoxicity, but also of P to reduce the likelihood of eutrophication.

In one embodiment, a product contains a complex of aluminum, cerium, lanthanum, and/or iron with anions (for example, chlorides, sulfates, nitrates, oxides, hydroxides, citrates, acetates, oxychlorides, silicates, oxalates, carbonates, and/or bicarbonates), in combination with one or more of rice bran powder, magnesium oxide, and bentonite. In one embodiment a product contains lanthanum and cerium in combination with one or more of rice bran powder, magnesium oxide, and bentonite. In one embodiment, a product contains $LaCl_3$ and/or $CeCl_3$ in combination with one or more of rice bran powder, magnesium oxide, and bentonite. In one embodiment, the product includes the individual ingredients as solids that are homogenized into a solid product (including, but not limited to, a powder or granular formulation). In another embodiment, the product is a liquid suspension concentrate containing both trivalent cations and one or more additives within the liquid suspension. In another embodiment, the product is separated into component formulations, and application of the product is simultaneous individual applications or sequential individual applications. For example, the trivalent cations and the one or more additives of the product may be separated into component formulations, but applied together or one immediately or shortly after the other.

As is shown below in Table 2, test samples containing the additives calcium hydroxide, sodium hydroxide, sodium metasilicate (anhydrous), or potassium oxalate (monohydrate) displayed a significant percent reduction (≥75%±10%) in dissolved lanthanum and cerium; however, test samples containing these additives did not display a preservation of P binding capability. For example, a test sample containing approximately 100.3 mg (±0.5 mg) of calcium hydroxide produced a reduction in dissolved La of approximately 95% and a reduction in dissolved Ce of approximately 98%; a test sample containing approximately 107.8 mg (±0.5 mg) of sodium hydroxide produced a reduction in dissolved La of approximately 98% and a reduction in dissolved Ce of approximately 99%; a test sample containing approximately 102.8 mg (±0.5 mg) of sodium metasilicate (anhydrous) produced a reduction in dissolved La of approximately 73% and a reduction in dissolved Ce of approximately 69%; and a test sample containing approximately 99.4 mg (±0.5 mg) of potassium oxalate (monohydrate) produced a reduction in dissolved La of approximately 83% and a reduction in dissolved Ce of approximately 82%. However, none of test samples displayed P-binding capability.

TABLE 2

Table 2. Capacity of different additives to bind La, Ce, and P.

| Sample | Weight (mg) | pH | La (mg/L) | Ce (mg/L) | % La reduction | % Ce reduction | La bound (mg/g) | Ce bound (mg/g) | Total La/Ce bound (mg/g) | Also binds P |
|---|---|---|---|---|---|---|---|---|---|---|
| Control (average) | — | 7 | 10.833 | 10.833 | — | — | — | — | — | — |
| Calcium hydroxide | 100.3 | 14 | 0.501 | 0.173 | 95% | 98% | 5.15 | 5.31 | 10.46 | NO |
| Sodium hydroxide | 107.8 | 14 | 0.187 | 0.106 | 98% | 99% | 4.94 | 4.98 | 9.91 | NO |
| Sodium metasilicate (anhydrous) | 102.8 | 13 | 2.9 | 3.39 | 73% | 69% | 3.86 | 3.62 | 7.48 | NO |
| Potassium oxalate (monohydrate) | 99.4 | 7 | 1.79 | 1.99 | 83% | 82% | 4.55 | 4.45 | 9.00 | NO |

As is shown below in Table 3, none of the test samples containing the additives calcium carbonate, triethanolamine, silica gel, almond shell powder, animal glue, carrageenan, sodium acrylate, beef gelatin, acacia gum, sodium citrate, sodium EDTA, sodium alginate, carboxymethylcellulose, chitosan, zeolite (crushed), activated carbon, cellulose, sodium tartrate, or glutamine displayed a significant percent reduction (≥75%±10%) in dissolved lanthanum and cerium, even though all did display a preservation of P-binding capability.

taining 1 L of deionized water. After the addition of lanthanum and cerium chloride, approximately 400 mg (±40 mg) of each additive or additive mixture was added to each beaker and the beaker was briefly stirred. After 30 minutes, approximately 10 mL of water was removed with a syringe and filtered with a 0.22 μm PTFE filter. Each filtered subsample was then acidified with 2% nitric acid and analyzed for presence and amounts of lanthanum (La) and cerium (Ce) using an ICP-OES. As shown below in Table 4, although rice bran appeared to be antagonistic (for example,

TABLE 3

Table 3. Capacity of different additives to bind La, Ce, and P.

| Sample | Weight (mg) | pH | La (mg/L) | Ce (mg/L) | % La reduction | % Ce reduction | La bound (mg/g) | Ce bound (mg/g) | Total La/Ce bound (mg/g) | Also binds P |
|---|---|---|---|---|---|---|---|---|---|---|
| Control (average) | — | 7 | 10.833 | 10.833 | — | — | — | — | — | — |
| Calcium carbonate | 105.8 | 7.5 | 6.45 | 7.11 | 40% | 34% | 2.07 | 1.76 | 3.83 | YES |
| Triethanolamine | 101.8 | 9.5 | 8.38 | 8.49 | 23% | 22% | 1.20 | 1.15 | 2.36 | YES |
| Silica gel | 99.3 | 7 | 9.4 | 9.44 | 13% | 13% | 0.72 | 0.70 | 1.42 | YES |
| Almond shell powder | 106.2 | 7 | 8.34 | 8.31 | 23% | 23% | 1.17 | 1.19 | 2.36 | YES |
| Animal glue | 100.8 | 7 | 9.2 | 9.29 | 15% | 14% | 0.81 | 0.77 | 1.58 | YES |
| Carrageenan | 99.1 | 8 | 4.69 | 4.07 | 57% | 62% | 3.10 | 3.41 | 6.51 | YES |
| Sodium acrylate | 107.7 | 7 | 12.3 | 13.9 | −14% | −28% | −0.68 | −1.42 | −2.10 | YES |
| Beef gelatin | 98.7 | 7 | 8.87 | 9.01 | 18% | 17% | 0.99 | 0.92 | 1.92 | YES |
| Acacia gum | 95.4 | 7 | 9.32 | 9.34 | 14% | 14% | 0.79 | 0.78 | 1.58 | YES |
| Sodium citrate | 98.7 | 8 | 8.63 | 8.67 | 20% | 20% | 1.12 | 1.10 | 2.21 | YES |
| Sodium EDTA | 107.3 | 9.5 | 8.6 | 8.68 | 21% | 20% | 1.04 | 1.00 | 2.04 | YES |
| Sodium alginate | 109.8 | 7 | 8.83 | 8.5 | 18% | 22% | 0.91 | 1.06 | 1.97 | YES |
| Carboxymethylcellulose | 99.1 | 7 | 8.65 | 8.69 | 20% | 20% | 1.10 | 1.08 | 2.18 | YES |
| Chitosan | 98.5 | 7 | 9.05 | 9.25 | 16% | 15% | 0.91 | 0.80 | 1.71 | YES |
| Zeolite (crushed) | 96 | 7 | 8.8 | 8.95 | 19% | 17% | 1.06 | 0.98 | 2.04 | YES |
| Activated carbon | 99.2 | 7 | 8.95 | 9.11 | 17% | 16% | 0.95 | 0.87 | 1.82 | YES |
| Cellulose | 103 | 7 | 6.99 | 7.62 | 35% | 30% | 1.87 | 1.56 | 3.43 | YES |
| Sodium tartrate | 98.8 | 6.5 | 8.83 | 8.89 | 18% | 18% | 1.01 | 0.98 | 2.00 | YES |
| Glutamine | 98.3 | 7 | 9.63 | 9.67 | 11% | 11% | 0.61 | 0.59 | 1.20 | YES |

Example 2

In one exemplary experiment, mixtures of rice bran powder, magnesium oxide (MgO), and bentonite clay were tested against the pure compounds to determine if a mixture of these additives could further enhance dissolved lanthanum and/or cerium binding. In this experiment, a liquid containing approximately 67% (±10%) cerium chloride and 33% (±10%) lanthanum chloride at a pH of about 3.5 (±0.7) was used to dose add approximately 32 mg (±5 mg) of cerium and 16 mg (±3 mg) of lanthanum to beakers con- ≤85% of expected La/Ce binding) with the other additives, magnesium oxide and bentonite clay were synergistic (for example, ≥115% of expected La/Ce binding) when added together.

In one embodiment, a product contains $LaCl_3$ and/or $CeCl_3$ in combination with magnesium oxide and/or bentonite clay. In one embodiment, a method includes applying a at least one trivalent metal salt and at least one additive. In one embodiment, the at least one additive is magnesium oxide and/or bentonite clay.

TABLE 4

Table 4. Capacity of different additives and combinations thereof to bind La and Ce.

| Sample | Rice bran (mg) | MgO (mg) | Bentonite (mg) | Total (mg) | La (mg/L) | Ce (mg/L) | Total La/Ce bound (mg/g) | Expected | Result |
|---|---|---|---|---|---|---|---|---|---|
| Control | — | — | — | 0 | 15.9 | 28.1 | — | — | — |
| MgO only | — | 410 | — | 410 | 12.6 | 15.2 | 39.4 | — | — |
| Bentonite only | — | — | 370 | 370 | 12.8 | 22.5 | 23.4 | — | — |
| Rice bran only | 380 | — | — | 380 | 12.6 | 22.0 | 24.6 | — | — |
| MgO & bentonite | — | 200 | 220 | 220 | 10.9 | 14.2 | 44.9 | 31.0 | Synergy |
| Rice bran & MgO | 210 | 190 | — | 440 | 15.1 | 24.8 | 10.2 | 31.7 | Antagonism |
| Rice bran & bentonite | 220 | — | 210 | 430 | 12.9 | 22.3 | 20.4 | 24.0 | Slight antagonism |

Example 3

In order to further examine the synergistic lanthanide binding of MgO and bentonite clay, an exemplary experiment was performed using the design described in Example 2 and with approximately 400 mg (±40 mg) of total additive in each sample except for the control, but various ratios of MgO and bentonite clay (by weight). As shown below in Table 4, the mixture of approximately 37.5% (±2.5%) MgO and approximately 62.5% (±2.5%) bentonite clay was superior to other blends in the reduction of dissolved lanthanum and cerium, with a total of 108 mg/g total of lanthanum and cerium (La/Ce) being bound.

TABLE 5

Capacity of different compositions of MgO and bentonite clay to bind La and Ce.

| Sample | La (mg/L) | Ce (mg/L) | La Bound (mg/g) | Ce Bound (mg/g) | Total La/Ce Bound (mg/g) |
|---|---|---|---|---|---|
| Control | 15.8 | 27.9 | — | — | — |
| 25% MgO/ 75% bentonite | 14.2 | 21.0 | 4.0 | 17.3 | 21.3 |
| 37.5% MgO/62.5% bentonite | 0.16 | 0.222 | 39.1 | 69.2 | 108.3 |
| 50% MgO/ 50% bentonite | 15.6 | 18.8 | 0.5 | 22.8 | 23.3 |
| 62.5% MgO/37.5% bentonite | 14.6 | 17.0 | 3.0 | 27.3 | 30.3 |
| 75% MgO/ 25% bentonite | 15.1 | 20.5 | 1.8 | 18.5 | 20.3 |

In one embodiment, a product contains a complex of aluminum, cerium, lanthanum, and/or iron with anions (for example, chlorides, sulfates, nitrates, oxides, hydroxides, citrates, acetates, oxychlorides, silicates, oxalates, carbonates, and/or bicarbonates), in combination with one or more of rice bran powder, magnesium oxide, and bentonite. In one embodiment a product contains lanthanum and/or cerium in combination with magnesium oxide and/or bentonite. In one embodiment, a product contains $LaCl_3$ and/or $CeCl_3$ in combination with magnesium oxide and/or bentonite. In one embodiment, a product contains $LaCl_3$ and/or $CeCl_3$ in combination with approximately 37.5% (±12.5%) magnesium oxide and approximately 62.5% (±12.5%) bentonite clay.

Example 4

In one exemplary experiment, using the same study design as Examples 2 and 3, while adding stir bars to continuously mix the samples, lanthanum and cerium samples were taken at several intervals: immediately after the additives were added; at 5 minutes after the additives were added; at 15 minutes after the additives were added; and at 30 minutes after the additives were added. Samples were standardized to 400 mg of additive in each beaker with pure MgO, pure bentonite, and a mixture of approximately 37.5% (±12.5%) MgO and approximately 62.5% (±12.5%) bentonite (referred to in this Example 4 as "the MgO/BC mixture"). Since the addition of magnesium oxide to deionized water can increase the pH which could lead to the formation of lanthanum and/or cerium hydroxide precipitants, approximately 37 mg of calcium hydroxide was added to another 1 L beaker to compare the impact of increasing the pH on the amount of dissolved lanthanum and cerium. The pH of each beaker was tested after the final samples were taken: the pH of the control was approximately 5.6 (±0.1); the pH of the magnesium oxide only sample was 8.0 (±0.1); the pH of the bentonite clay only sample was 6.5 (±0.1); the pH of the MgO/BC mixture was 7.5 (±0.1); and the pH of the calcium hydroxide sample was 8.7 (±0.1). As shown in FIG. 1, increasing the pH with calcium hydroxide does not result in as much of a reduction of dissolved lanthanum and cerium as the MgO/BC mixture, even though the pH is substantially higher. Bentonite clay initially binds the largest amount of lanthanum and cerium, but appears to desorb the bound ions with time and ends up with a fairly low overall binding capacity. In contrast, magnesium oxide does not bind much lanthanum and cerium initially, but continues to bind more as time passes. The MgO/BC mixture demonstrated high initial binding and increased binding with time.

In one embodiment, a product contains $LaCl_3$ and/or $CeCl_3$ in combination with magnesium oxide and/or bentonite. In one embodiment, a product contains $LaCl_3$ and/or $CeCl_3$ in combination with approximately 37.5% (±12.5%) magnesium oxide and approximately 62.5% (±12.5%) bentonite clay. In one embodiment, the portion of the product that comprises the at least one additive includes a mixture of approximately 37.5% (±12.5%) magnesium oxide and approximately 62.5% (±12.5%) bentonite clay. The percentages of the at least one additive may be measured on a per volume basis or a per weight basis, depending on the formulation of the product.

Reducing Amount of Dissolved Copper

In one embodiment, a metallic trivalent cation is used to reduce the concentration of dissolved copper in a body of water after an application of a copper-based algaecide and/or aquatic herbicide. In one embodiment, products in accordance with the present disclosure include complexes of aluminum, cerium, lanthanum, and/or iron with anions including, but not limited to, chlorides, sulfates, nitrates, oxides, hydroxides, citrates, acetates, oxychlorides, silicates, oxalates, carbonates, and/or bicarbonates. In one exemplary method of use, a product containing a metallic trivalent cation is applied before, after, and/or simultaneously with a copper-based algaecide and/or aquatic herbicide to reduce the amount of dissolved copper in the water column. For example, a copper-based algaecide and/or aquatic herbicide may be applied and allowed to act on the target nuisance organism for a pre-determined amount of time. Then, after the pre-determined amount of time has elapsed, the product containing a metallic trivalent cation may be applied to bind the freely available copper in the body of water, thereby reducing the potential for ecotoxicity while maintaining the ability of the copper-based algaecide and/or aquatic herbicide to control the target nuisance organism. In another exemplary method of use, a product containing a metallic trivalent cation is applied simultaneously with a copper-based algaecide and/or aquatic herbicide to reduce the amount of dissolved copper in the water column. The ability of the product to bind dissolved copper is unexpected because both copper cations and the metallic trivalent cations have a positive charge and, therefore, would be expected to repel each other.

Example 5

In one exemplary experiment, four cultures of the cyanobacterium *Microcystis* spp. ("*Microcystis*") in 50-mL centrifuge tubes were treated with 1 mg Cu/L as $CuSO_4$. Two hours after the treatment with $CuSO_4$, half (two) of the culture samples were treated with a combination of 10 mg La/L and 10 mg Ce/L using a mixed solution of lanthanum chloride ($LaCl_3$) and cerium chloride ($CeCl_3$) (referred to in Table 6 below as "La/Ce treatment 1" and "La/Ce treatment 2") and the other half (two) were used as untreated controls. All samples were shaken and allowed to rest for two hours. Dissolved copper in all samples was then evaluated by filtering each sample with a 0.45 µm PES filter after the two-hour period. The amount of dissolved copper in each sample was analyzed using the USEPA Bicinchoninate Method and spectrophotometric analysis.

As shown in Table 6 below, the addition of La and Ce resulted in the coagulation of the cyanobacteria cells that likely bound the copper. Thus, in one embodiment, a product contains La and/or Ce and a copper-based algaecide. For example, the La and Ce may be in the form of a mixed solution of lanthanum chloride ($LaCl_3$) and cerium chloride ($CeCl_3$). In one embodiment, the algaecide of the product is a granular algaecide, which slowly releases copper from sediment. In one embodiment, the product contains La and Ce and is without a copper-based algaecide. For example, in one embodiment the product contains $LaCl_3$ and $CeCl_3$ only. In another embodiment, the product contains $LaCl_3$ and $CeCl_3$, as well as optional additives (such as binders, solvents, adjuvants, inert ingredients, etc.).

When applied to a body of water in combination with or after a copper-based algaecide, the product removes copper-containing algal cells from the water column to reduce non-target impact. Additionally, in embodiments wherein the algaecide is granular algaecide, the La and Ce of the product may pull algal cells to the algaecide granules to intercept the copper that is being released into the water column. Thus, the product not only reduces non-target impacts, but also increases efficacy of the algaecide ingredient.

In one exemplary method of use, La and Ce are applied simultaneously with a copper-based algaecide. In another exemplary method of use, La and Ce are applied before and/or after the application of a copper-based algaecide. In one embodiment, the product contains La and Ce (for example, $LaCl_3$ and $CeCl_3$), but is without a copper-based algaecide. In another embodiment, the product contains La and Ce (for example, $LaCl_3$ and $CeCl_3$) as well as a copper-based algaecide.

TABLE 6

The capacity of La/Ce to reduce copper in the water column.

| Sample | Copper Concentration (mg/L) | Average Copper Concentration (mg/L) |
|---|---|---|
| Control 1 | 0.616 | 0.580 |
| Control 2 | 0.544 | |
| La/Ce treatment 1 | 0.126 | 0.120 |
| La/Ce treatment 2 | 0.114 | |

Reducing the Depletion of Dissolved Oxygen Following an Aquatic Plant Herbicide Treatment In one embodiment, a metallic trivalent cation is used to reduce the depletion of dissolved oxygen in a body of water following an aquatic plant herbicide treatment. Products in accordance with the present disclosure may be used to manage sediment quality using chemical addition, rather than mechanical and/or physical processes such as aeration and/or oxygenation. This is unexpected, as the trivalent metals are designed to target phosphorus and should have minimal interaction with factors related to sediment quality, such as dissolved oxygen, sediment organic matter, electron acceptors, and the like.

In one embodiment, a product includes complexes of aluminum, cerium, lanthanum, and/or iron with anions including, but not limited to, chlorides, sulfates, nitrates, oxides, hydroxides, citrates, acetates, oxychlorides, silicates, oxalates, carbonates, and/or bicarbonates. In one embodiment, a product includes a metallic trivalent cation, such as a salt of La and/or Ce. In one exemplary method of use, a product containing a metallic trivalent cation is applied to a body of water simultaneously with, before, and/or after the application of an algaecide and/or aquatic herbicide.

Example 6

In one exemplary experiment, each of two five-gallon buckets included pond water, a 16-oz cup with sediment and an established community of *Hydrilla* spp. ("*Hydrilla*") and a 16-oz cup with sediment and an established community of *Vallisneria* spp. ("*Vallisneria*"). Each bucket had adequate dissolved oxygen (8-10 mg/L) near the sediment-water interface in the cups and all plants were healthy, with a similar amount of biomass in each cup. One bucket was then treated with copper (copper ethylene diamine, applied as Harpoon®, SePRO Corporation) at a rate of 0.2 mg Cu/L and diquat (applied as Weedtrine® D, SePRO Corporation) at a rate of 10 gallons per acre-ft, and the other bucket was treated with the same application of copper and diquat plus an aqueous mixture of approximately 33% (±10%) lanthanum chloride ($LaCl_3$) and approximately 67% (±10%) cerium chloride ($CeCl_3$) at a rate of approximately 0.33 mg La/L and approximately 0.67 mg Ce/L. About 25 days after application, dissolved oxygen readings were taken at the sediment-water interface of each cup containing the dying *hydrilla* and *Vallisneria*. After the dissolved oxygen measurements were taken, the cups were removed and biomass was quantified for each plant type. Herbicidal efficacy was estimated based on observations and pictures of the reduction in biomass after the treatment.

As shown in Tables 7 and 8 below, the application of La and Ce after or simultaneously with the application of an algaecide and/or aquatic herbicide, such as a combination of copper and diquat, results in reduced depletion (greater preservation) of dissolved oxygen and increased herbicidal efficacy.

TABLE 7

Ability to preserve dissolved oxygen in water column after use of aquatic pesticides (copper and diquat), with and without La/Ce.

| Sample | Dissolved Oxygen (mg/L) | | |
|---|---|---|---|
| | Water Column | Hydrilla | Vallisneria |
| Copper/diquat only | 10.4 | 0.6 | 0.7 |
| Copper/diquat + La/Ce | 9.3 | 4.4 | 6.7 |

TABLE 8

Herbicidal efficacy of copper and diquat, with and without La/Ce.

| Sample | Herbicidal Efficacy | |
|---|---|---|
| | Hydrilla | Vallisneria |
| Copper/diquat only | 95% | 50% |
| Copper/diquat + La/Ce | 90% | 85% |

In one embodiment, a method of preserving dissolved oxygen levels in a body of water and minimizing non-target effects includes applying a metallic trivalent cation (for example, La and/or Ce) with the application of an algaecide and/or aquatic herbicide to the body of water. In one embodiment, a method of preserving dissolved oxygen levels and minimizing non-target effects includes applying an algaecide and/or aquatic herbicide to a body of water, and then applying a metallic trivalent cation (for example, La and/or Ce). In one embodiment, the algaecide and/or aquatic herbicide includes copper and/or diquat.

In one embodiment, a product contains a metallic trivalent cation (for example, La and/or Ce). In one embodiment, a product contains an aqueous mixture or trivalent metal salts, such as a mixture of approximately 33% (±10%) lanthanum chloride ($LaCl_3$) and approximately 67% (±10%) cerium chloride ($CeCl_3$). In one embodiment, a product contains an algaecide and/or aquatic herbicide plus an aqueous mixture of approximately 33% (±10%) lanthanum chloride ($LaCl_3$) and approximately 67% (±10%) cerium chloride ($CeCl_3$). In one embodiment, the algaecide and/or aquatic herbicide includes copper and/or diquat. In some embodiments, the product contains other ingredients in addition to the lanthanum chloride and/or cerium chloride, such as diluents, carriers, adjuvants, pesticides, and the like. In one such embodiment, the portion of the product that comprises the trivalent metal salts includes a mixture of approximately 33% (±10%) lanthanum chloride ($LaCl_3$) and approximately 67% (±10%) cerium chloride ($CeCl_3$). The percentages of the trivalent metal salts may be measured on a per volume basis or a per weight basis, depending on the formulation of the product.

Enhancing the Efficacy of an Aquatic Plant and Algae Pesticide Treatment

In one embodiment, a metallic trivalent cation is used to enhance the efficacy of an aquatic plant, algae, and/or cyanobacteria pesticidal treatment. In one embodiment, products in accordance with the present disclosure include complexes of aluminum, cerium, lanthanum, and/or iron with anions including, but not limited to, chlorides, sulfates, nitrates, oxides, hydroxides, citrates, acetates, oxychlorides, silicates, oxalates, carbonates, and/or bicarbonates. In one embodiment, a product in accordance with the present disclosure includes a metallic trivalent cation, such as a salt of La and/or Ce. In one exemplary method of use, a product containing a metallic trivalent cation (for example, as a metal salt) is applied to a body of water before, during, and/or after the application of an algaecide and/or aquatic herbicide to enhance the efficacy of the algaecide and/or aquatic herbicide and to enhance binding of the metallic trivalent cation.

Example 7

The increased efficacy of the combination of lanthanum, cerium, and diquat on herbicidal efficacy of *Vallisneria* was further explored. A study to compare the effects of herbicide only, lanthanum and cerium only, and combinations of herbicides and lanthanum and cerium was performed using 16-ounce cups containing duckweed (*Lemna* spp.) and 400 mL of well water. These samples were placed under artificial lighting with a scheduled 16-hour light period and 8-hour dark period. Herbicide treatments included diquat at 150 µg/L concentration (as Weedtrine® D), carfentrazone at 150 µg/L concentration (as Stingray™, SePRO Corporation), copper ethanolamine at 1 mg-Cu/L (as Komeen®, SePRO Corporation), and fluridone at 60 µg/L (as Sonar Genesis®, SePRO Corporation). For La and Ce (referred to in Table 9 below as "La/Ce") only and combinations with herbicides, a liquid containing approximately 67% (±10%) cerium chloride ($CeCl_3$) and 33% (±10%) lanthanum chloride ($LaCl_3$) at a pH of approximately 3.5 (±0.7) was used to dose add approximately 730 µg/L (±10 g/L) of cerium and 365 µg/L of lanthanum (±5 µg/L). An untreated control was also used. Plant coverage was determined using the Canopeo application software (Oklahoma State University) at four points during the study: prior to treatments, 3 days post treatment, 5 days post treatment, and 7 days post treatment. The observed percentage of plant coverage (plant presence or density based on the fractional green canopy coverage in the image) with time is shown below in Table 9.

TABLE 9

Plant coverage at different time intervals before and after application of aquatic pesticides, with and without La/Ce.

| Sample Name | Pre-Treat. | 3 Days Post | 5 Days Post | 7 Days Post |
|---|---|---|---|---|
| Untreated control | 34% | 34% | 35% | 37% |
| Diquat only | 40% | 10% | 4% | 3% |
| Carfentrazone only | 34% | 39% | 24% | 29% |
| Copper ethanolamine only | 35% | 35% | 4% | 4% |
| Fluridone only | 25% | 23% | 22% | 22% |
| La/Ce only | 27% | 27% | 28% | 27% |
| Diquat + La/Ce | 37% | 1% | 1% | 1% |
| Carfentrazone + La/Ce | 33% | 30% | 20% | 18% |
| Copper + La/Ce | 37% | 36% | 5% | 3% |
| Fluridone + La/Ce | 27% | 20% | 16% | 15% |

Percent change was calculated for each sample and each sampling period by subtracting the percent plant coverage at each sampling period from the pre-treatment plant coverage and dividing this value by the initial (pre-treatment) plant coverage. The expected results for the herbicide and La/Ce combinations were calculated by the sum of the percent change in plant coverage for the herbicide-only sample and the La/Ce-only sample. As is shown below in Table 10, a synergy (for example, >5% decrease in percent coverage) was observed for all sampling dates for combinations of La/Ce with diquat, carfentrazone, and fluridione.

TABLE 10

Table 10. Percent change in plant coverage at different time intervals before and after application of aquatic pesticides, with and without La/Ce, and results.

| | 3 Days Post | | | 5 Days Post | | | 7 Days Post | | |
|---|---|---|---|---|---|---|---|---|---|
| Sample | % Change | Expected | Result | % Change | Expected | Result | % Change | Expected | Result |
| Untreated control | 1% | | N/A | 3% | | N/A | 10% | | N/A |
| Diquat only | −75% | | | −89% | | | −92% | | |
| Carfentrazone only | 13% | | | −29% | | | −17% | | |
| Copper ethanolamine only | −2% | | | −89% | | | −89% | | |
| Fluridone only | −8% | | | −15% | | | −14% | | |
| La/Ce only | −1% | | | 2% | | | 0% | | |
| Diquat + La/Ce | −97% | −76% | Synergy | −97% | −87% | Synergy | −99% | −92% | Synergy |
| Carfentrazone + La/Ce | −11% | 12% | Synergy | −40% | −27% | Synergy | −45% | −17% | Synergy |
| Copper ethanolamine + La/Ce | −2% | −3% | Antagonism | −86% | −87% | Slight Antagonism | −91% | −89% | Slight Synergy |
| Fluridone + La/Ce | −24% | −9% | Synergy | −38% | −12% | Synergy | −42% | −14% | Synergy |

In one embodiment, a method of increasing herbicidal efficacy when applied to a body of water includes applying a product to the body of water that contains a metallic trivalent cation (for example, La and/or Ce). In one embodiment, a product contains $LaCl_3$ and/or $CeCl_3$. In one embodiment, a product contains approximately 33% $LaCl_3$ (±10%) and approximately 67% (±10%) $CeCl_3$. In one embodiment, a product contains an algaecide and/or aquatic herbicide plus approximately 33% (±10%) lanthanum chloride ($LaCl_3$) and approximately 67% (±10%) cerium chloride ($CeCl_3$). In one embodiment, the algaecide and/or aquatic herbicide includes diquat, carfentrazone, and/or fluridone. In one embodiment, a method of increasing herbicidal efficacy when applied to a body of water includes applying an algaecide and/or aquatic herbicide to the body of water, and then applying a product to the body of water that contains a metallic trivalent cation (for example, La and/or Ce).

In one embodiment, a product contains a metallic trivalent cation (for example, La and/or Ce). In one embodiment, a product contains $LaCl_3$ and/or $CeCl_3$. In one embodiment, a product contains approximately 33% (±10%) $LaCl_3$ and approximately 67% (±10%) $CeCl_3$. In one embodiment, a product contains an algaecide and/or aquatic herbicide plus approximately 33% (±10%) lanthanum chloride ($LaCl_3$) and approximately 67% (±10%) cerium chloride ($CeCl_3$). In one embodiment, the algaecide and/or aquatic herbicide includes diquat, carfentrazone, and/or fluridone.

Example 8

The effect of combining lanthanum and cerium with a copper-sulfate-based algaecides was examined. In this study, a 1-L culture of predominantly *Microcystis* sp. Was homogenized and 40 mL of the culture was added to 50 mL centrifuge tubes. These samples were placed under artificial lighting with a scheduled 16-hour light period and 8-hour dark period. The algaecide treatment included a copper-sulfate based algaecide at 200 µg-Cu/L concentration (as SeClear™, SePRO Corporation). For lanthanum and cerium (referred to in Table 11 as "La/Ce") only and combinations of La/Ce with the algaecide, a liquid containing approximately 67% (±10%) cerium chloride ($CeCl_3$) and approximately 33% (±10%) lanthanum chloride ($LaCl_3$) at a pH of approximately 3.5 (±0.7) was used to dose add approximately 155 µg/L of cerium and approximately 78 µg/L of lanthanum. An untreated control was also used. The algae population in each sample was measured by centrifuging samples at 7 days following the treatment, and cells per mL were determined using a microscope and a hemocytometer.

Percent control was calculated by subtracting the cells per mL for each sample from the untreated control and dividing this value by the cells per mL in the untreated control. The expected control was calculated for the algaecide and La/Ce combination by the sum of the algaecide only percent control and the La/Ce only percent control. As shown below in Table 11, there is a synergy for combination treatments of lanthanum and cerium with copper sulfate-based algaecide.

TABLE 11

Algaecidal efficacy, with and without La/Ce, and results.

| Sample | Cells/mL | % Control | Expected % Control | Result |
|---|---|---|---|---|
| Control | 2,375,000 | — | — | — |
| Copper sulfate-based algaecide | 1,750,000 | 26% | — | — |
| La/Ce only | 2,687,500 | −13% | — | — |
| Copper sulfate-based algaecide + La/Ce | 625,000 | 74% | 13% | Synergy |

In one embodiment, a method of increasing herbicidal efficacy when applied to a body of water includes applying a product to the body of water that contains a metallic trivalent cation (for example, La and/or Ce). In one embodiment, a product contains $LaCl_3$ and/or $CeCl_3$. In one embodiment, a product contains approximately 33% (±10%) $LaCl_3$ and approximately 67% (±10%) $CeCl_3$. In one embodiment, a product contains an algaecide and/or aquatic herbicide plus approximately 33% (±10%) lanthanum chloride ($LaCl_3$) and approximately 67% (±10%) cerium chloride ($CeCl_3$). In one embodiment, the algaecide and/or aquatic herbicide is a copper sulfate-based algaecide. In one embodiment, a method of increasing herbicidal efficacy when applied to a body of water includes applying a copper sulfate-based algaecide to the body of water, and then applying a product to the body of water that contains a metallic trivalent cation (for example, La and/or Ce).

In one embodiment, a product contains a metallic trivalent cation (for example, La and/or Ce). In one embodiment, a product contains $LaCl_3$ and/or $CeCl_3$. In one embodiment, a product contains approximately 33% (±10%) $LaCl_3$ and approximately 67% (±10%) $CeCl_3$. In one embodiment, a product contains an algaecide and/or aquatic herbicide plus approximately 33% (±10%) lanthanum chloride ($LaCl_3$) and approximately 67% (±10%) cerium chloride ($CeCl_3$). In one embodiment, the algaecide and/or aquatic herbicide is a copper sulfate-based algaecide.

Example 9

In an exemplary experiment to investigate the effect of combining lanthanum and cerium with chelated copper and peroxide-based algaecides, a 1-L mixed culture of predominantly cyanobacteria was homogenized and 40 mL of the culture was added to 50 mL centrifuge tubes. These samples were placed under artificial lighting with a scheduled 16-hour light period and 8-hour dark period. Algaecide treatments included a triethanolamine and monethanolamine chelated copper algaecide at 200 µg-Cu/L concentration (as Captain®, SePRO Corporation) and a peroxyacetic acid and hydrogen peroxide algaecide at 12.2 mg/L hydrogen peroxide and 2.3 mg/L peroxyacetic acid (as Oximycin® P5, SePRO Corporation). For lanthanum and cerium (referred to in Table 12 as "La/Ce") only and combinations with the algaecide, a liquid containing approximately 67% (±105%) cerium chloride ($CeCl_3$) and approximately 33% (±10%) lanthanum chloride ($LaCl_3$) at a pH of approximately 3.5 (±0.7) was used to dose add approximately 730 µg/L of cerium and 365 µg/L of lanthanum. An untreated control was also used. Three replicates of each sample were used in this study. Phycocyanin abundance of cyanobacteria in each replicate was measured using a handheld fluorometer (FluoroQuick™, Amiscience Corporation). Percent control was calculated by subtracting average phycocyanin content for each sample from the average phycocyanin content of the untreated control and dividing this value by average phycocyanin content in the untreated control. The expected control was calculated for the algaecide and La/Ce combinations by the sum of the algaecide only percent control and the La/Ce only percent control. As shown below in Table 12, there is a synergy for combination treatments of La/Ce with both chelated copper and peroxide algaecides.

TABLE 12

Table 12. Algaecidal efficacy, with and without La/Ce, and results.

| | Phycocyanin (RFU) | | | | % | | |
|---|---|---|---|---|---|---|---|
| Sample | Rep. 1 | Rep. 2 | Rep. 3 | Average | Control | Expected | Outcome |
| Control | 1,247 | 1,265 | 1,308 | 1,273 | — | — | — |
| Peroxide only | 249 | 254 | 230 | 244 | 81% | — | — |
| Chelated copper | 487 | 432 | 511 | 477 | 63% | — | — |
| La/Ce only | 1,232 | 1,233 | 1,229 | 1,231 | 3% | — | — |
| Peroxide + La/Ce | 14 | 31 | 19 | 22 | 98% | 84% | Synergy |
| Chelated copper + La/Ce | 218 | 281 | 291 | 263 | 79% | 66% | Synergy |

Reducing Dissolved Metals in a Water Column Before, During, and/or after Pesticide Application In one embodiment, a metallic trivalent cation is used before, during, and/or shortly after the application of an algaecide or aquatic herbicide, reducing the water column concentration of the dissolved form of the metal. In one embodiment, products in accordance with the present disclosure include complexes of aluminum, cerium, lanthanum, and/or iron with anions including, but not limited to, chlorides, sulfates, nitrates, oxides, hydroxides, citrates, acetates, oxychlorides, silicates, oxalates, carbonates, and/or bicarbonates. In one exemplary method of use, a product containing metallic trivalent cations is applied before, during, or shortly after an algaecide application, before the algaecidal effect occurs, in order to reduce the concentration of the dissolved metal within the water column when compared with the application of the product after the algaecidal effect has started. In one exemplary method of use, a product containing metallic trivalent cations is applied before, during, or shortly after an herbicide application, before the herbicidal effect occurs, in order to reduce the concentration of the dissolved metal within the water column when compared with the application of the product after the herbicidal effect has started. For example, a water body may contain sensitive species that my experience toxicity from the presence of high levels of dissolved metals and application of a trivalent metal salt before the addition of an herbicide and/or algaecide that impedes uptake would minimize the dissolved metal concentration and therefore exposure of the sensitive species. The increased concentration of the dissolved metals following a pesticide application is surprising because dying plants and algae begin to release soluble-reactive phosphorus as they die, and it would be expected that the binding to released phosphate would reduce the dissolved metal concentration much quicker than plant or algae uptake. The ability of the plants and algae to rapidly uptake trivalent metals while actively growing can be strategically utilized to allow the plants or algae to uptake the dissolved metals right before using a pesticide, which was previously shown to be synergistic in combination with trivalent cations such as lanthanum and cerium. Further, sensitive species may benefit from reduced exposure to dissolved trivalent cations and the pesticide could be used at a lower rate due to greater efficacy, thereby reducing the exposure of sensitive species to the pesticide as well.

Example 10

In one exemplary experiment, 16-oz cups were filled with 400 mL of well water containing approximately 100 μg-P/L as phosphate. One cup was left as the no biomass control and approximately 8 g (±0.5 g) of actively growing duckweed were added to the other cups. One cup was left as a control and diquat (as Weedtrine® D) was added to each of the other cups at the following rates: 50 μg/L. 100 μg/L, 200 μg/L, and 300 μg/L. These samples were then placed under artificial lighting with a scheduled 16-hour light period and 8-hour dark period. After 24 hours, plant injury was rated and a liquid lanthanum and cerium chloride mixture containing approximately 67% (±10%) cerium chloride and approximately 33% (±10%) lanthanum chloride at a pH of approximately 3.5 (±0.7) was used to add 730±g/L cerium and 365 μg/L lanthanum to each cup. Samples then were briefly stirred and allowed to sit under the lighting. After 2 hours, water samples were collected with a syringe, filtered with a 0.22 μm nylon filter, acidified with nitric acid, and analyzed for lanthanum and cerium concentration. As shown below in Table 13 and in FIG. 2, all cups containing duckweed had lower dissolved lanthanum and cerium concentrations than the no-biomass control and the concentration of dissolved lanthanum and cerium was higher with greater plant injury and diquat concentration applied.

TABLE 13

Duckweed control and dissolved La and Ce with different concentrations of aquatic herbicide (diquat).

| Sample | Perceived injury | Dissolved Ce (μg/L) | Dissolved La (μg/L) | Total Dissolved Ce & La (μg/L) |
|---|---|---|---|---|
| No-biomass control | N/A | 547 | 315 | 862 |
| Duckweed control (no herbicide) | 0% | 203 | 149 | 352 |
| Duckweed + 50 μg/L diquat | 20% | 271 | 175 | 446 |
| Duckweed + 100 μg/L diquat | 40% | 305 | 191 | 496 |
| Duckweed + 200 μg/L diquat | 50% | 248 | 166 | 414 |
| Duckweed + 300 μg/L diquat | 80% | 385 | 222 | 607 |

Example 11

In one exemplary experiment, 50 mL centrifuge tubes were filled with 40 mL of water with a mixed algae and cyanobacteria community containing approximately 100 μg-P/L as phosphate. These samples were placed under artificial lighting with a scheduled 16-hour light period and 8-hour dark period. Some samples were left untreated and some samples were treated with algaecides. Algaecide treatments included a triethanolamine and monethanolamine chelated copper algaecide at 500 μg-Cu/L concentration (as Captain® XTR, SePRO Corporation) and a peroxyacetic acid and hydrogen peroxide algaecide at 12.2 mg/L hydrogen peroxide and 2.3 mg/L peroxyacetic acid (as Oximycin® P5). Trivalent cation salts were applied at either 3 hours, 6 hours, 24 hours, or 48 hours after the algaecide. Lanthanum and cerium were added to each sample at a rate of 730 μg/L of cerium and 365 μg/L of lanthanum using a liquid containing approximately 67% (±10%) cerium chloride and approximately 33% (±10%) lanthanum chloride at a pH of approximately 3.5 (±0.7). Two hours after the addition of lanthanum and cerium, water samples were collected with a syringe, filtered with a 0.22 μm nylon filter, acidified with nitric acid, and the samples then were analyzed for lanthanum and cerium concentration. As shown below in Table 14, the untreated controls and 3-hour-post algaecide samples (both peroxide and copper treatments) contained the lowest level of lanthanum and cerium concentrations and the concentration of dissolved lanthanum and cerium was higher with increasing time after the algaecide was applied.

TABLE 14

Table 14. Effects of aquatic herbicides (peroxide and copper) on dissolved La and Ce.

| | Cerium (µg/L) | | | Lanthanum (µg/L) | | |
|---|---|---|---|---|---|---|
| Sample | Rep. 1 | Rep. 2 | Average | Rep. 1 | Rep. 2 | Average |
| Untreated control | 46 | 59 | 53 | 53 | 65 | 59 |
| 3-hr-post peroxide | 34 | 45 | 40 | 50 | 60 | 55 |
| 6-hr-post peroxide | 157 | 89 | 123 | 177 | 62 | 120 |
| 24-hr-post peroxide | 502 | 459 | 481 | 252 | 233 | 243 |
| 48-hr-post peroxide | 472 | 564 | 518 | 233 | 273 | 253 |
| 3-hr-post copper | 55 | 57 | 56 | 60 | 64 | 62 |
| 6-hr-post copper | 89 | 102 | 96 | 80 | 87 | 84 |
| 24-hr-post copper | 502 | 459 | 481 | 252 | 233 | 243 |
| 48-hr-post copper | 557 | 576 | 567 | 270 | 279 | 275 | containing approximately 67% (10%) cerium chloride and approximately 33% (±10%) lanthanum chloride at a pH of approximately 3.5 (±0.7). Sub samples of water from homogenized treatment vessels were collected with a syringe, then filtered through a 0.22-µm nylon filter, and acidified with nitric acid. Samples were collected initially, and then at 1, 2, 4, 24, and 48 hours after treatment on each treatment including untreated control, peroxide algaecide alone, trivalent solution alone and combination of algaecide and trivalent solution. The samples were analyzed for the dissolved lanthanum and cerium concentrations by ICP-OES. For samples that were below the detection limit of 10 µg/L, one half of the detection limit (5 µg/L) was used for calculations. As shown in Table 15 below, the simultaneous application of peroxide and trivalent cations led to 73% less dissolved cerium and 69% less dissolved lanthanum on average when compared to the addition of trivalent cation solution alone for equivalent time points.

TABLE 15

Table 15. Effects of simultaneous application of peroxide on dissolved La and Ce in algae-rich lake water.

| | | Cerium (µg/L) | | | | | Lanthanum (µg/L) | | | | |
|---|---|---|---|---|---|---|---|---|---|---|---|
| Sample | Hours treatment after | Rep. 1 | Rep. 2 | Rep. 3 | Average | % Difference from La/Ce only | Rep. 1 | Rep. 2 | Rep. 3 | Average | % Difference from La/Ce only |
| La/Ce only | 1 | 94.6 | N/A | N/A | 94.6 | | 52.6 | N/A | N/A | 52.6 | |
| | 2 | 94.3 | N/A | N/A | 94.3 | | 53.2 | N/A | N/A | 53.2 | |
| | 4 | 70.3 | N/A | N/A | 70.3 | | 40.2 | N/A | N/A | 40.2 | |
| | 24 | 37.2 | N/A | N/A | 37.2 | | 22.7 | N/A | N/A | 22.7 | |
| | 48 | 27.9 | N/A | N/A | 27.9 | | 16.5 | N/A | N/A | 16.5 | |
| Peroxide + La/Ce | 1 | 31.2 | 18.9 | 28.7 | 26.3 | −72% | 22.5 | 12.7 | 20.3 | 18.5 | −65% |
| | 2 | 22.1 | 26.8 | 28.5 | 25.8 | −73% | 16.1 | 18.6 | 20.1 | 18.3 | −66% |
| | 4 | 19.3 | 21.3 | 15.7 | 18.8 | −73% | 15.0 | 15.8 | 10.7 | 13.8 | −66% |
| | 24 | 11.1 | <10.0 | <10.0 | <10.0 | −87% | <10.0 | <10.0 | <10.0 | <10.0 | −78% |
| | 48 | 10.1 | 11.0 | 10.3 | 10.5 | −62% | <10.0 | <10.0 | <10.0 | <10.0 | −70% |
| | | | | | Average | −73% | | | | Average | −69% |

Example 12

In one exemplary experiment, field-collected site water from Lake Okeechobee, Florida, was treated with three different treatments: an algaecide alone; a trivalent cation solution alone; and a simultaneous combination of the algaecide and trivalent cation solution. Each treatment contained 500 mL of site water with approximately 10,000 cells/mL of *Microcystis aeruginosa*. Treatments were maintained at a 16-hour light period and 8-hour dark period and 23±2° C. The algaecide treatment was a hydrogen peroxide and peroxyacetic acid algaecide and applied as 3.8 mg/L hydrogen peroxide and 0.72 mg/L peroxyacetic acid (as Oximycin® P5, SePRO Corporation). The lanthanum and cerium trivalent cation solution was added at a rate of 365 µg/L of cerium and 183 µg/L of lanthanum using a liquid

EMBODIMENTS

In one embodiment, a method for delivery of a trivalent cation, the method avoiding the need for an industrial process to cohere the components while reducing the concentration of dissolved trivalent metals, comprises: simultaneous addition of a metallic trivalent cation complex and at least one of rice bran powder, magnesium oxide, and bentonite. In one embodiment, the metallic trivalent cation complex is a complex of at least one of aluminum, cerium, lanthanum, and iron. In one embodiment, the metallic trivalent cation complex further includes at least one anion, the at least one anion being at least one of a chloride, a sulfate, a nitrate, an oxide, a hydroxide, a citrate, an acetate, an oxychloride, a silicate, an oxalate, a carbonate, and/or a bicarbonate.

Some embodiments result in an increased efficacy or safety of algaecides and/or aquatic herbicides. In one aspect of an embodiment, a trivalent cation is used in combination with an aquatic herbicide to increase the herbicidal activity to the target nuisance aquatic plant. In one aspect of an embodiment, a trivalent cation is used in combination with an algaecide to increase the algaecidal activity (adverse effects) to the target nuisance cyanobacteria or algae. In one aspect of an embodiment, a trivalent cation is used following the application of a copper-based algaecide and/or aquatic herbicide to reduce the concentration of the dissolved copper in the water column, reducing non-target ecotoxicity potential.

Some embodiments advantageously provide the benefit of enhancing sediment quality through preserving dissolved oxygen at the sediment-water interface, increasing the sediment redox, and reducing the accumulation of sediment organic matter.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method of reducing a dissolved metal concentration in a body of water, the body of water containing phosphorus, the method comprising applying a product to a body of water, the product including at least one trivalent metal salt and at least one additive,
    binding the phosphorus that is present in the body of water with the at least one trivalent metal salt, the at least one trivalent metal salt including a trivalent metal salt of lanthanum and/or cerium, at least some of the trivalent metal salt dissolving within the water to release dissolved metals; and
    binding the dissolved metals with the at least one additive, the at least one additive including magnesium oxide.

2. The method of claim 1, wherein the at least one trivalent metal salt further includes a trivalent metal salt of aluminum and/or iron.

3. The method of claim 1, wherein the at least one trivalent metal salt comprises a mixture of approximately 33% lanthanum chloride and approximately 67% cerium chloride.

4. The method of claim 1, wherein the at least one additive further includes bentonite clay.

5. The method of claim 4, wherein the at least one additive includes approximately 37.5% magnesium oxide by weight and approximately 62.5% bentonite clay by weight.

6. The method of claim 1, wherein:
    the step of applying the product to the body of water includes applying the at least one trivalent metal salt and the at least one additive simultaneously to the body of water.

7. A water treatment product for application to a body of water, the body of water containing phosphorus, the water treatment product comprising:
    at least one trivalent metal salt, the at least one trivalent metal salt being configured to bind at least some of the phosphorus that is present within the body of water, with at least some of the trivalent metal salt dissolving within the water to release dissolved metals; and
    at least one additive, the at least one additive being configured to bind at least some of the dissolved metals within the body of water, the at least one additive including magnesium oxide.

8. The water treatment product of claim 7, wherein the at least one additive further includes bentonite clay.

9. The water treatment product of claim 8, wherein the at least one additive includes magnesium oxide present in an amount of approximately 37.5% by weight and bentonite clay present in an amount of approximately 62.5% by weight.

10. The water treatment product of claim 9, wherein the at least one trivalent metal salt comprises a mixture of approximately 33% lanthanum chloride and approximately 67% cerium chloride.

* * * * *